United States Patent [19]

Grey

[11] Patent Number: 5,004,374
[45] Date of Patent: Apr. 2, 1991

[54] METHOD OF LAYING OUT A PATHWAY FOR PIPING

[76] Inventor: Bettie Grey, 900 Ficklen Rd., Fredericksburg, Va. 22405

[21] Appl. No.: 486,393

[22] Filed: Feb. 28, 1990

[51] Int. Cl.$^5$ .............................................. F16L 1/00
[52] U.S. Cl. .................................. 405/154; 138/177; 165/45; 165/172
[58] Field of Search .................. 405/154, 157, 36, 43, 405/45; 138/177, 103, 105; 165/45, 184, 172, 910, 100, 102, 103; 62/259, 260

[56] References Cited

U.S. PATENT DOCUMENTS

| | | | |
|---|---|---|---|
| 795,772 | 7/1905 | Janney | 165/45 X |
| 1,823,661 | 9/1931 | O'Brien | 165/45 X |
| 2,077,846 | 4/1937 | McIlvana | . |
| 2,749,724 | 6/1956 | Borgerd et al. | . |
| 2,793,509 | 5/1957 | Keen | 165/45 X |
| 3,712,371 | 1/1973 | ter Haar et al. | . |
| 3,926,008 | 12/1975 | Webber | . |
| 4,042,012 | 8/1977 | Petty et al. | . |
| 4,314,397 | 2/1982 | Goolsby et al. | . |
| 4,373,346 | 2/1983 | Hebert et al. | . |
| 4,495,989 | 1/1985 | Sievers | . |
| 4,513,585 | 4/1985 | Maisonneuve | . |
| 4,570,452 | 2/1986 | Bingham | 165/45 X |
| 4,690,205 | 9/1987 | Jelbring | 165/45 |
| 4,825,943 | 5/1989 | Fournier et al. | 165/172 X |

Primary Examiner—Dennis L. Taylor
Attorney, Agent, or Firm—Arent, Fox, Kintner, Plotkin & Kahn

[57] ABSTRACT

An improved method of laying out a continuous pathway for piping is provided wherein the pathway is laid out in a torus shape which spirals vertically and includes a plurality of vertically descending and ascending levels. A medium may flow through the pathway by descending on the odd-numbered vertical levels and ascending on the even-numbered vertical levels such that the flow of the medium moves through the pathway on substantially alternating vertical levels. The alternate levels are interconnected by crossover lengths of piping. The pathway utilizes less surface area by making use of the descending and ascending levels of pathway thereby utilizing greater depths instead of greater surface area. The method also provides a greater diversity of configurations for laying out a pathway than heretofore used.

9 Claims, 3 Drawing Sheets

SECTION B-B

SECTION A-A 5,004,374

1

METHOD OF LAYING OUT A PATHWAY FOR PIPING

BACKGROUND OF THE INVENTION

There is presently the need for an improved method of laying out a continuous pathway for piping such that the piping requires a lesser amount of surface area and utilizes a greater amount of depth in a horizontal layout and provides a variety of shape configurations to conform to diverse land areas.

Prior methods utilized relatively large land areas for lengthy parallel loop systems of laying out pipe because the prior methods laid out pipes such that the pipes only descended to five or six feet in depth and did not utilize to a full extent the advantages of soft copper and flexible plastic pipe which make the use of arcs possible in the layout.

SUMMARY OF THE INVENTION

It is therefore an object of the present invention to provide a method of laying out a continuous pathway for piping which requires a lesser amount of surface area.

It is a further object of the present invention to provide a method of laying out a continuous pathway for piping which utilizes a greater amount of depth in a horizontal layout.

It is also an object of the present invention to provide a method of laying out a continuous pathway for piping which utilizes either soft copper or flexible plastic pipe.

Additional objects and advantages of the invention will be set forth in part in the description which follows, and in part will be obvious from the description, or may be learned by practice of the invention. The objects and advantages of the invention may be realized and attained by means of the instrumentalities and combinations pointed out in the appended claims.

To achieve the objects and in accordance with the purpose of the invention, as embodied and broadly described herein, a method of laying out a continuous pathway for piping is provided wherein the piping allows a flow of medium therethrough and includes the steps of laying out a pathway in a torus shape which spirals vertically and includes a plurality of interconnected vertically descending and ascending levels; providing a separate length of piping for each of a plurality of horizontal levels; numbering in sequence, beginning with number 1, a beginning port and ending ports of each separate length of piping on each horizontal level; numbering in sequence, beginning with number 1, each level of piping for each of the vertically descending and ascending levels; positioning an inlet port and an outlet port of the continuous pathway proximate each other at adjacent levels; and flowing a medium through the inlet port and into the pathway such that a flow of the medium descends on a plurality of odd-numbered vertical levels and said flow of said medium ascends on a plurality of even-numbered vertical levels up to the outlet port, and such that the flow of the medium moves through the pathway on substantially alternating vertical levels.

The accompanying drawings, which are incorporated in and constitute a part of this specification, illustrate several embodiments of the invention and, together with the description, serve to explain the principles of the invention.

2

DETAILED DESCRIPTION OF THE PREFERRED EMBODIMENTS

Figure 1A:
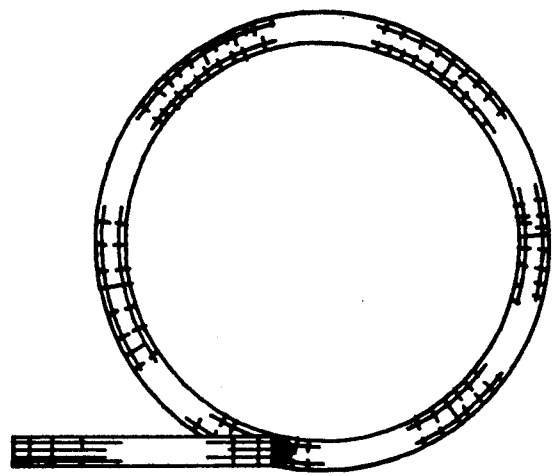
FIG. 1A is a top view illustrating the method of laying out a continuous pathway for piping in accordance with a first preferred embodiment of the invention.

Reference will now be made in detail to the present preferred embodiments of the invention, examples of which are illustrated in the accompanying drawings in which like reference characters refer to corresponding elements.

Figure 1B:
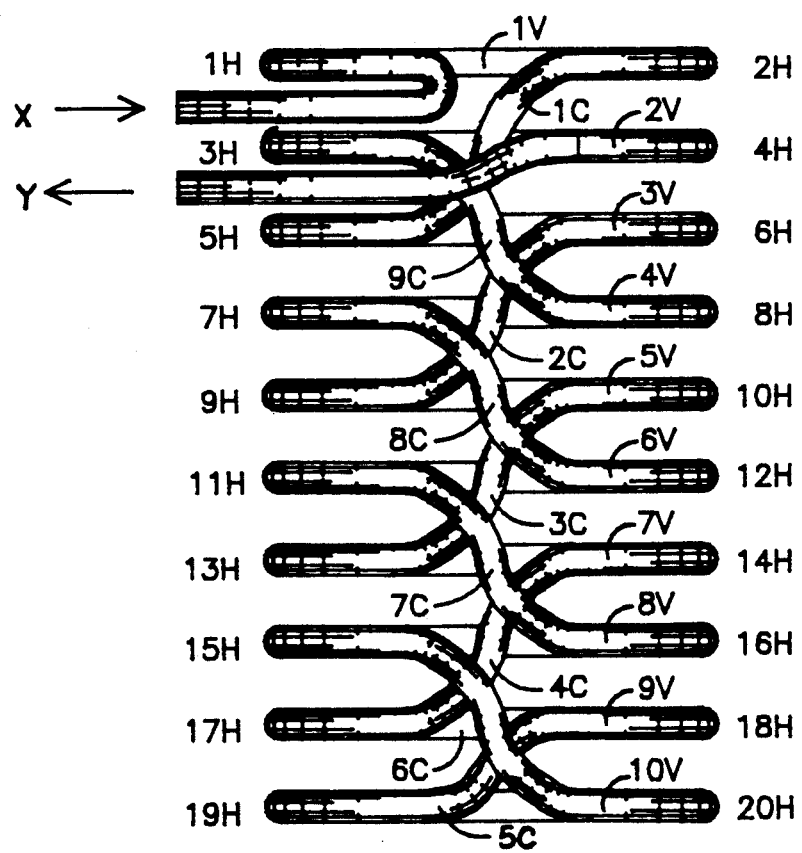
FIG. 1B is a side view of FIG. 1A.
Figure 2A:
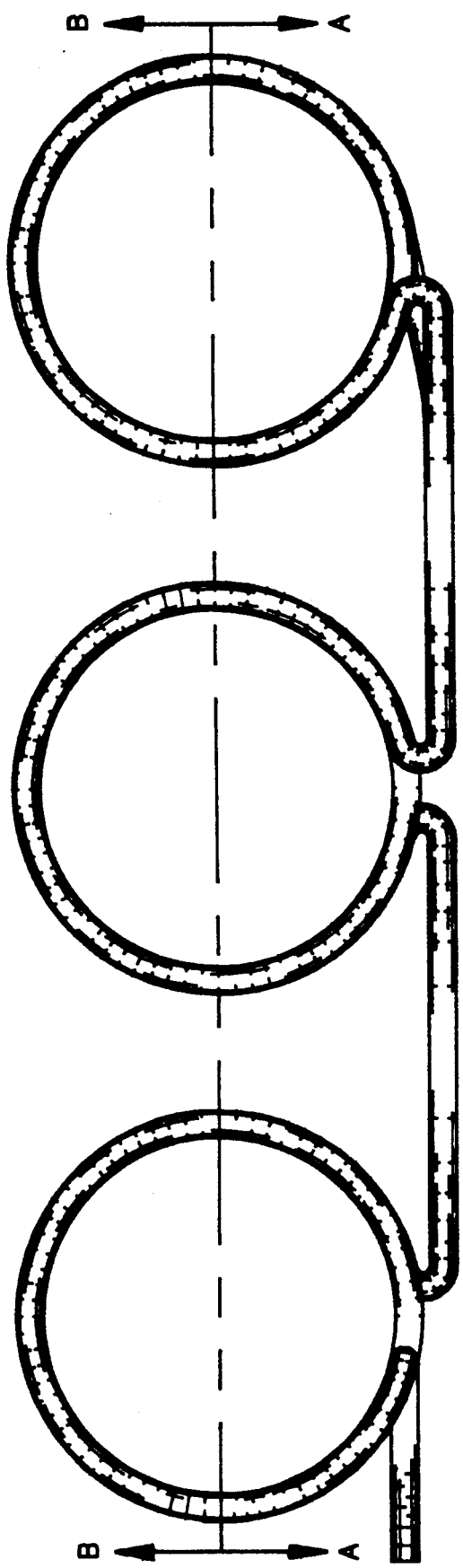
FIG. 2A is a top view illustrating the method of laying out a pathway for piping in accordance with a second preferred embodiment of the invention.
Figure 2B:
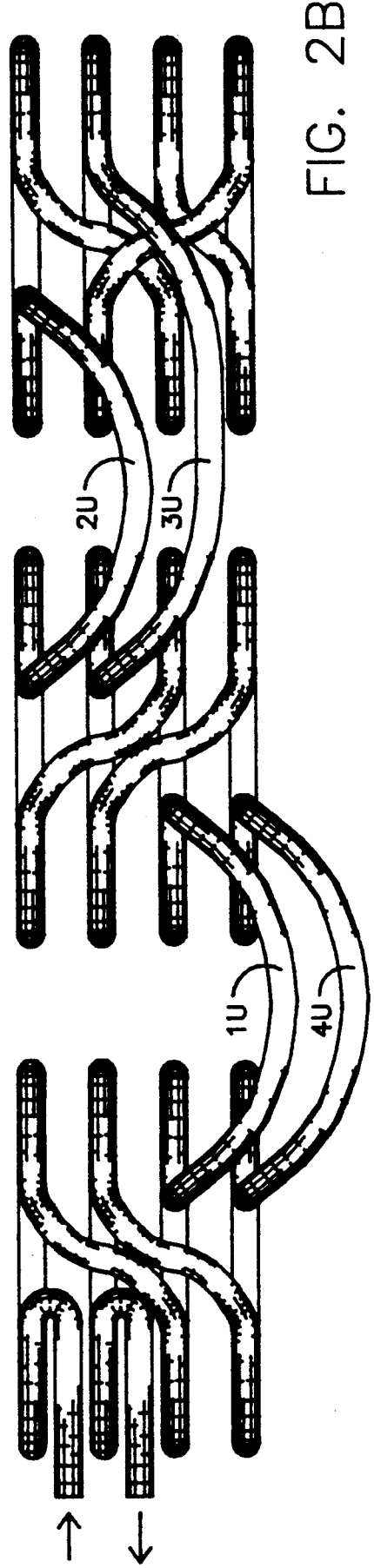
FIG. 2B is a side view of the embodiment of FIG. 2A.
Figure 2C:
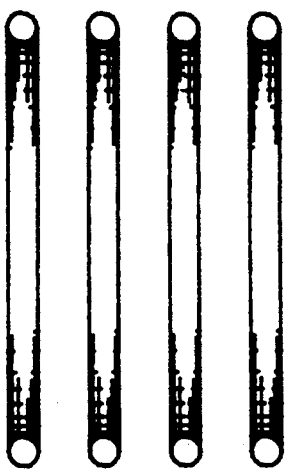
FIG. 2C is a cross-sectional view of the embodiment of FIG. 2B taken along the line B—B.
Figure 2C:
Figure 2C:
Figure 2D:
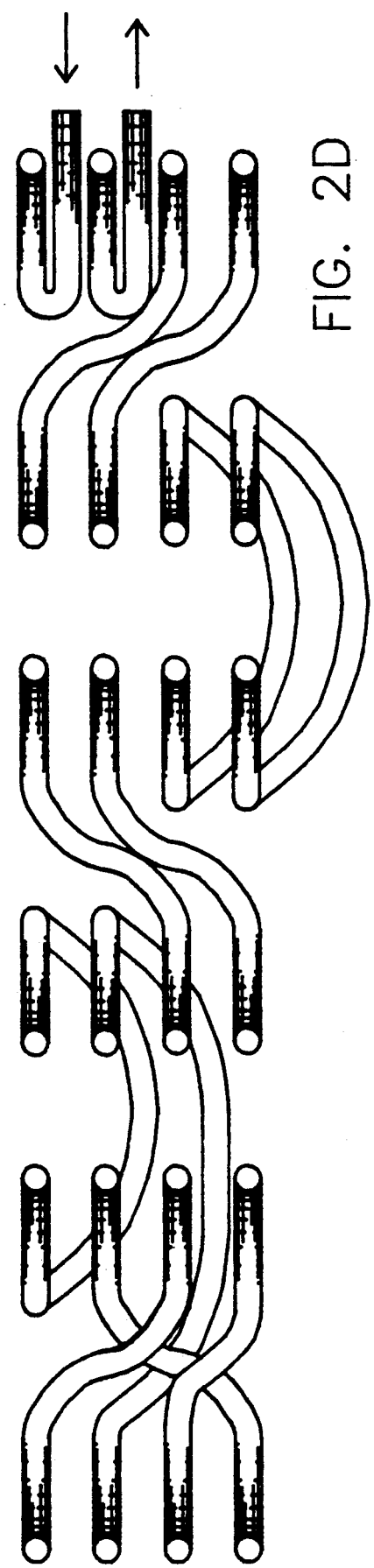
FIG. 2D is a cross-sectional view of the embodiment of FIG. 2B taken along the line A—A.

The first preferred embodiment of the invention is shown in FIG. 1. The present invention includes a method of laying out a continuous pathway for piping. The method includes the step of laying out a pathway in a torus shape which spirals vertically and includes a plurality of interconnected vertically descending and ascending levels as shown in FIG. 1B. The method further includes the step of providing a separate length of piping for each of a plurality of horizontal levels. The next step includes numbering in sequence, beginning with number 1, a beginning port and an ending port of each separate length of piping on each horizontal level. As embodied herein, on the first horizontal level with the first length of piping, the beginning port is numbered 1H and the ending port is numbered 2H.

The method further includes numbering in sequence, beginning with number 1, each level of piping for each of the vertically descending and ascending levels. As embodied herein, the vertical levels are shown as 1V to 10V in FIG. 1B. The next step includes positioning an inlet port and an outlet port of the continuous pathway proximate each other at adjacent levels. As embodied herein, the inlet port is shown as X and the outlet port is shown as Y in FIG. 1B.

Lastly, the method of the present invention includes the step of flowing a medium through the inlet port X and into the pathway such that a flow of the medium descends on a plurality of odd-numbered vertical levels, 1V, 3V, 5V, 7V, 9V and 10V in FIG. 1B, and the flow of the medium ascends on a plurality of even-numbered vertical levels, 10V, 8V, 6V, 4V and 2V in FIG. 1B up to the outlet port Y, and such that the flow of the medium moves through the pathway on substantially alternating verfical levels. It should be noted that in a torus having an even number of levels, unless the descent and ascent directions are reversed, the medium will descend on a plurality of odd-numbered vertical levels and on the last even-numbered vertical level.

As illustrated in FIG. 1B, the plurality of interconnected horizontal levels may be interconnected via a plurality of S-shaped crossover lengths of piping, wherein one of the crossover lengths of piping interconnects two alternate levels of piping in a diagonal direction, except for the last descending crossover which interconnects two adjacent levels of piping. As embodied herein, 2H and 5H are interconnected via 1C, 6H and 9H are interconnected via 2C, 10H and 13H are interconnected via 3C, 14H and 17H are interconnected via 4C, 18H and 19H are interconnected via 5C, 20H and 15H are interconnected via 6C, 16H and 11H are interconnected via 7C, 12H and 7H are interconnected via 8C and 8H and 3H are interconnected via 9C. As an alternative to the use of curved S-shaped crossover lengths of piping for interconnecting levels, straight X-shaped lengths of piping may be used interchangeably throughout.

As an alternative to the use of a single torus shape for the pathway, a FIG. 8 configuration may also be used. The FIG. 8 configuration consists of two torus shapes joined by crossovers. Additionally, four torus shapes may be used to form a clover-leaf configuration with the crossovers joining the torus shapes and interconnecting the levels.

Also, a continuous pathway in the form of a torus shape may be formed from multiple lengths of pipe in adjacent positions to each other on a horizontal level and may be joined to other lengths of pipe on multiple vertical levels by crossovers connecting the adjacent positions and interconnecting the levels by substantially alternating positions and levels. This torus shape may be contained within another enveloping torus-shaped pipe or cylindrical drum.

It is preferable to use flexible copper tubing for the piping since copper is an excellent conductor with almost twice the conductivity of plastic piping. Also flexible plastic pipe may be used such as polybutylene or polyethylene pipe. It is also preferable to include spacers with clamps placed to separate the levels of piping.

A second embodiment of the present invention is illustrated in FIGS. 2A to 2D. This embodiment of the continuous pathway illustrates the use of multiple torus shapes facing the same direction. The direction of facing is determined by the direction of the horizontal ports of the separate lengths of piping. The torus shapes are interconnected by U-shaped torus connectors 1U to 4U shown in FIG. 2B and thus provide a greater amount of length of piping within a long, narrow surface area, such as an area which would begin underneath a house and extend into a garden.

The pathway of the present invention may be practically used as a ground-coupled heat exchanger. In the past, ground-coupled heat exchangers were not practical for most residential properties as they required a large amount of surface area, approximating the square footage of the house or a greater amount of area. The piping was laid out in long trenches outside the house. The method of the present invention will decrease the amount of surface area needed since it lays out the piping on a plurality of descending and ascending levels. The method may still make use of a large length of pipe, however, the decreased surface area requirements will make it more practical for homes which do not sit on a large plot of land. The distance travelled by the medium on its return to the outlet port Y is the same as the distance travelled in the outward flow from the inlet port X. The heat absorbed from the earth or sunk into the earth by the time of the return flow tends to restore the temperature loss or gain of the earth changed by the outward flow. By alternating levels, the distance between directional flows is increased from that of a spiral with adjacent levels and a single return pipe.

As an alternative to the ground as a source of energy, the method of the present invention may be coupled with energy sources such as water or the sun.

The embodiment described above with respect to the enveloping torus configuration may be used as a preheater or a precooler wherein the inner piping may be separate from the continuous pathway that envelopes it and may contain a small heating element, in the case of a preheater, or may be a separate line in the refrigerant cycle, in the case of a precooler. The inner piping serves to heat or cool the fluid flowing around it in the outer piping, cylinder, or cylindrical drum.

In systems now in use, connections of pipe for reasons of manufactured pipe length or changes of direction of the pattern often lie at varying places in the system. In this system, connections are made in uniform places in the design either along a single area in the front of the design or in the center for two or four-fold patterns. Access to these areas may be included in the design for easy detection of leaks most often found at connecting joints. For a FIG. 8 configuration in actual installation the piping may be laid out in a continuous fashion to form a S-shape for each horizontal level with separate crossover lengths interconnecting only between levels, thus limiting the number of connections and the possibility of leaks in the system.

It will be apparent to those skilled in the art that various modifications and variations can be made in the method of the present invention without departing from the scope or spirit of the invention. Thus, it is intended that the present invention cover the modifications and variations provided they come within the scope of the appended claims and their equivalents.

What is claimed is:

1. A method of laying out a continuous pathway for piping, said piping for allowing a flow of a medium therethrough, comprising the steps of:
    (a) laying out a pathway in a torus shape which spirals vertically and includes a plurality of interconnected vertically descending and ascending levels;
    (b) providing a separate length of piping for each of a plurality of horizontal levels;
    (c) numbering in sequence, beginning with number 1, a beginning port and an ending port of each separate length of piping on each horizontal level;
    (d) numbering in sequence, beginning with number 1, each level of piping for each of said vertically descending and ascending levels;
    (e) positioning an inlet port and an outlet port of said continuous pathway proximate each other at adjacent levels; and
    (f) flowing a medium through said pathway such that a flow of said medium descends on a plurality of odd-numbered vertical levels and said flow of said medium ascends on a plurality of even-numbered vertical levels up to said outlet port, and such that said flow of said medium moves through said pathway on substantially alternating vertical levels.

2. The method of claim 1, wherein said plurality of interconnected vertically descending and ascending levels are interconnected via a plurality of S-shaped crossover lengths of piping, one of said S-shaped crossover lengths of piping interconnecting two alternate levels of piping in a diagonal direction.

3. The method of claim 1, wherein said plurality of interconnected vertically descending and ascending levels are interconnected via a plurality of X-shaped crossover lengths of piping, one of said X-shaped crossover lengths of piping interconnecting two alternate levels of piping in a diagonal direction.

4. A method of laying out a continuous pathway for piping, said piping for allowing a flow of medium therethrough, comprising the steps of:
 (a) laying out a pathway in a FIG. 8 configuration, said FIG. 8 configuration including two torus shapes, one of said two torus shapes facing a direction opposite to another of said two torus shapes, wherein said continuous pathway spirals vertically and includes a plurality of interconnected vertically descending and ascending levels;
 (b) providing a separate length of piping for each of a plurality of horizontal levels for each of said two torus shapes;
 (c) numbering in sequence, beginning with number 1, a beginning port and an ending port of each separate length of piping on each horizontal level such that for each of said two torus shapes the odd-numbered port of one of said two torus shapes will be opposite the odd-numbered port of another of said two torus shapes in a diagonal direction and the even-numbered port of said one of said two torus shapes will be opposite the even-numbered port of said another of said two torus shapes in a diagonal direction;
 (d) numbering in sequence, beginning with number 1, each level of piping for each of said vertically descending and ascending levels;
 (e) positioning an inlet port and an outlet port of said continuous pathway proximate each other at adjacent levels; and
 (f) flowing a medium through said inlet port and into said pathway such that a flow of said medium descends on a plurality of odd-numbered vertical levels and said flow of said medium ascends on a plurality of even-numbered vertical levels up to said outlet port, and such that said flow of said medium moves through said pathway on substantially alternating vertical levels.

5. The method of claim 4, wherein said plurality of interconnected vertically descending and ascending levels are interconnected via a plurality of S-shaped crossover lengths of piping, one of said S-shaped crossover lengths of piping interconnecting two alternate levels of piping in a diagonal direction and another of said S-shaped crossover lengths of piping interconnecting said two torus shapes on the same horizontal level in a diagonal direction.

6. The method of claim 1 wherein said piping is comprised of flexible copper tubing.

7. The method of claim 1 wherein said piping is comprised of flexible plastic tubing.

8. The method of claim 1 wherein said pathway is a ground coupled heat exchanger.

9. The method of claim 7 wherein spacers with clamps are used to separate levels of piping.

* * * * *